US012437662B2

(12) United States Patent
Sharma

(10) Patent No.: US 12,437,662 B2
(45) Date of Patent: Oct. 7, 2025

(54) CERTIFICATION TESTING

(71) Applicant: DTN Staffing, Inc., Mandan, ND (US)

(72) Inventor: Sheriff Sharma, Bismark, ND (US)

(73) Assignee: DTN STAFFING, INC., Mandan, ND (US)

( * ) Notice: Subject to any disclaimer, the term of this patent is extended or adjusted under 35 U.S.C. 154(b) by 0 days.

(21) Appl. No.: 18/519,179

(22) Filed: Nov. 27, 2023

(65) Prior Publication Data

US 2024/0177622 A1 May 30, 2024

Related U.S. Application Data

(60) Provisional application No. 63/385,054, filed on Nov. 28, 2022.

(51) Int. Cl.
*G09B 7/00* (2006.01)

(52) U.S. Cl.
CPC ..................................... *G09B 7/00* (2013.01)

(58) Field of Classification Search
CPC ...... G09B 7/00; G06Q 50/20; G06Q 50/2053; G06Q 50/2057
See application file for complete search history.

(56) References Cited

U.S. PATENT DOCUMENTS

| | | | | |
|---|---|---|---|---|
| 6,341,212 B1 * | 1/2002 | Shende | | G09B 5/02 434/323 |
| 2001/0031457 A1 * | 10/2001 | Pfenninger | | G09B 5/00 434/350 |
| 2005/0008998 A1 * | 1/2005 | Munger | | G09B 7/02 434/350 |
| 2005/0095571 A1 * | 5/2005 | Miller | | G09B 7/02 434/350 |
| 2008/0096181 A1 * | 4/2008 | Rogers | | G09B 7/02 434/362 |
| 2012/0042358 A1 * | 2/2012 | Kondur | | G09B 7/02 726/3 |
| 2012/0176220 A1 * | 7/2012 | Garcia | | G06F 21/32 340/5.83 |
| 2013/0078605 A1 * | 3/2013 | Toussaint, Jr. | | G09B 7/02 434/362 |
| 2013/0089849 A1 * | 4/2013 | Huang | | G09B 5/08 434/352 |
| 2013/0344471 A1 * | 12/2013 | Pansegrau | | G09B 7/00 434/362 |
| 2016/0019379 A1 * | 1/2016 | Sadeh | | G06F 21/32 434/362 |
| 2018/0144656 A1 * | 5/2018 | Mitros | | G09B 7/04 |
| 2019/0197461 A1 * | 6/2019 | Anderson | | G06F 21/31 |
| 2020/0402415 A1 * | 12/2020 | Jones | | G09B 7/08 |
| 2021/0090450 A1 * | 3/2021 | Frist, Jr. | | G09B 19/00 |
| 2022/0103389 A1 * | 3/2022 | Dua | | G09B 21/001 |

* cited by examiner

*Primary Examiner* — Peter R Egloff
(74) *Attorney, Agent, or Firm* — Fredrikson & Byron, P.A.

(57) ABSTRACT

A method includes receiving student input, from a remote student device, associated with a certification test student; receiving instructor input, from a remote instructor device, associated with a certification test instructor; assigning a unique certification test code to the certification test instructor; using the received student input and the received instructor input to generate a certification test for the certification test student; and upon receiving the unique certification test code from the certification test instructor, administering the certification test.

20 Claims, 13 Drawing Sheets

Home / Dashboard / Exams

Exams

| Exam Date | Exam Status | Result | Student | Instructor | Test Center | | |
|---|---|---|---|---|---|---|---|
| Thu, 07/07/2022 - 09:30 am | Complete | Fail | chaitanya | | Grand Forks | 📷 | ✏️ |
| Wed, 07/06/2022 - 03:48 pm | In Progress | | joe_student | joe_instructor | Fargo | 📷 | ✏️ |
| Wed, 07/06/2022 - 03:25 pm | Complete | Fail | joe_student | Instructorone | Fargo | 📷 | ✏️ |
| Tue, 05/17/2022 - 02:17 pm | Complete | Fail | suvi | sheriff.instructor | Fargo | 📷 | ✏️ |
| Tue, 05/17/2022 - 11:20 am | Complete | Fail | suvi | sheriff.instructor | Fargo | 📷 | ✏️ |
| Fri, 04/29/2022 - 09:35 am | Complete | Fail | suvi | sheriff.instructor | Fargo | 📷 | ✏️ |
| Thu, 04/28/2022 - 10:08 am | Complete | Fail | suvi | sheriff.instructor | Fargo | 📷 | ✏️ |
| Wed, 04/27/2022 - 09:20 pm | Approved | | student 2 | | Fargo | 📷 | ✏️ |

Admin Dashboard Users

Home / Dashboard / Admin Dashboard Users

First, Last or User Name

Roles: - Any -

Status: - Any -

[APPLY]

- Any -
Student
Instructor
Test Center Admin

| First Name | Last Name | | Role | Status | App Status | |
|---|---|---|---|---|---|---|
| | | Wed, 06/29/2022 - 12:26 pm | | Pending | + | ✎ |
| test | student | Fri, 04/29/2022 - 09:46 am | Student | Active | ✓ | ✎ |
| Suvarcha | Pawar | Wed, 03/16/2022 - 11:06 am | Student | Active | + | ✎ |
| Chaitanya | Mehta | Wed, 03/16/2022 - 10:58 am | Student | Active | ✓ | ✎ |
| Pallavi | Pratap | Wed, 03/16/2022 - 10:58 am | Student | Active | ✓ | ✎ |
| Frances | Jones | Wed, 03/16/2022 - 10:52 am | Student | Active | ✓ | ✎ |
| Ranuj | Kapoor | Wed, 03/16/2022 - 10:51 am | Student | Active | + | ✎ |

414

CNA EXPRESS    Take a Test    Become Test Center    Admin ▼    Log Out

Home / Dashboard / Exam #34 - paw1234

Exam #34 - paw1234

[View] Edit

*Submitted by suvi on Wed, 04/27/2022 - 12:53 pm*

[START EXAM] ← 428

↙ 425

EXAM DETAILS

Order ID:
34

Status:
In Progress

Requested Dates:
Wed, 04/27/2022 - 01:52 pm

Scheduled Date:
Fri, 09/09/2022 - 05:50 pm

Exam Template:
ND - CNA Written Exam (test)

↙ 426

STUDENT DETAILS

Name: Suvarcah Pawar
ID: paw1234
Email: suvi@dtnstaffing.com
SSN: XXX-XX-1234
Phone: 12345

INSTRUCTOR DETAILS

Name:
Email:

↙ 427

TEST CENTER DETAILS

Fargo

Address:
TestCenter One
NetCenter
3487 S University Dr
West Fargo, ND 58104
United States

Phone:
7012350940

CERTIFICATION TESTING

RELATED APPLICATION

This disclosure claims priority to U.S. provisional patent application No. 63/385,054, filed on Nov. 28, 2022, the contents of which are hereby incorporated by reference.

TECHNICAL FIELD

The disclosure relates to devices, systems, and methods for administering certification testing. In particular, certain embodiments disclosed herein relate to devices, systems, and methods for administering certified nursing assistant (CNA) testing to qualify for a certified nursing assistant certification.

BACKGROUND

Typically to qualify as a certified nursing assistant, an individual must receive a certified nursing assistant (CNA) certification from an authorized regulatory authority. The authorized regulatory authority promulgates certain requirements to obtain a certified nursing assistant certification, including submitting a CNA certification application and passing a CNA certification test.

However, current means by which CNA certification testing is administered can be inefficient and inconsistent. For example, administering a CNA test can involve three separate parties: a student applying to take the CNA test; an administrator responsible for registering the student for the CNA test, generating the CNA test, and scoring/reporting the result of the CNA test; and an instructor responsible for proctoring the CNA test while it is in progress at the scheduled time. Current means by which CNA certification testing is administered can be fragmented amongst these separate parties and can result in significant inefficiencies for each of these separate parties. Yet, with a current need for more certified nursing assistants in the healthcare industry, the fragmented and inefficient process of current means for administering CNA certification testing can discourage applicants from the CNA certification process and, as such, can act to compound the lack of sufficient certified nursing assistants available in the healthcare industry.

SUMMARY

In general, this disclosure relates to devices, systems, and methods for administering certification testing. For example, exemplary embodiments disclosed herein relate to devices, systems, and methods for administering certified nursing assistant (CNA) testing to qualify for a certified nursing assistant certification. Such embodiments disclosed herein can allow for administering certification testing efficiently and dynamically amongst multiple parties involved in the certification testing process. For instance, as it relates to a CNA testing application, embodiments disclosed herein can provide an integrated portal for use by each of a student applying to take the CNA test; an administrator responsible for registering the student for the CNA test, generating the CNA test, and scoring/reporting the result of the CNA test; and an instructor responsible for proctoring the CNA test while it is in progress at the scheduled time. This integrated portal can prompt input of data needed from each of the student, administrator, and instructor, synergistically use this input data from the student, administrator, and instructor to approve a student application, schedule a CNA test for that student, administer the CNA test for that student, and generate a CNA test result corresponding to the CNA test taken by that student.

Embodiments disclosed herein can be implemented, for example, using programmable processing circuitry. For example, such programmable processing circuitry can execute non-transitory computer readable instructions to cause the programmable processing circuitry to receive input from one or more parties, such as input from one or more certification test students, certification test administrators, and certification test instructors, which input can include a certification test application, approval of a certification test application, selection of a plurality of questions from a test question database for inclusion with a certification test, selection of a test center site, selection of a certification test time, available times for proctoring a certification test as an instructor, and certification test score results. Such programmable processing circuitry can execute non-transitory computer readable instructions to then cause the programmable processing circuitry to use this received input from one or more parties (e.g., from each of a certification test student, certification test administrator, and certification test instructor) to schedule a certification test for a specific student, assign a specific instructor to proctor the certification test, assign a certification test center site, generate questions for compiling and inclusion with the certification test, score the certification test by comparing predetermined answers to the questions with student input answers to these questions, and present a certification test result to the student. This sequence can then be efficiently repeated by the programable processing circuitry to generate another certification test for another student. Accordingly, such an implementation can be useful in dynamically generating and administering a certification test to a student in a way that leverages, in a synergistically integrated manner, received input from each of a student, an administrator, and an instructor within a repeatable and efficient framework for generating a plurality of such certification tests for a plurality of different students and instructors.

One embodiment includes a method. This method embodiment includes receiving student input (e.g., from a remote student device), receiving instructor input (e.g., from a remote instructor device), and receiving test center input. This method embodiment can use at least one (e.g., each) of the received student input, received instructor input, and received test center input to generate a certification test for a student from whom student input was previously received. In a further embodiment, after generating the certification test, the method can include administering the certification test.

Another embodiment includes an apparatus having programmable processing circuitry to: receive student input (e.g., from a remote student device), receive instructor input (e.g., from a remote instructor device), and receiving test center input. This programmable processing circuitry embodiment can use at least one (e.g., each) of the received student input, received instructor input, and received test center input to generate a certification test for a student from whom student input was previously received. In a further embodiment, after generating the certification test, this programmable processing circuitry can cause the certification test to be administered. The programmable processing circuitry can be configured to perform such actions, for instance, by executing non-transitory computer-readable instructions included at a stored test administration module.

One embodiment includes a method. This method embodiment includes the steps of: receiving student input, from a remote student device, associated with a certification test student; receiving instructor input, from a remote instructor device, associated with a certification test instructor; assigning a unique certification test code to the certification test instructor; using the received student input and the received instructor input to generate a certification test for the certification test student; and upon receiving the unique certification test code from the certification test instructor, administering the certification test.

In a further embodiment of this method, the unique certification test code is received as input from the certification test instructor in response to presentation of a first certification test code input display at the remote instructor device, and the first certification test code input display is presented at the remote instructor device as a result of selection of a start exam icon at the remote instructor device. In one such example, the unique certification test code can be assigned to the certification test instructor: (i) after receiving both the student input associated with the certification test student and the instructor input associated with the certification test instructor, and (ii) upon scheduling the certification test. In an additional or alternative example, the method can additionally include a step of, after administering the certification test, presenting a second certification test code input display at the remote instructor device. In a further such example, the method can include: in response to presentation of the second certification test code input display, receiving the unique certification test code assigned to the certification test instructor; and, in response to receiving, at the second certification test code input display, the unique certification test code assigned to the certification test instructor, terminating the certification test.

In a further embodiment of this method, the received student input and the received instructor input can be used to generate a certification test by retrieving certification test parameters from a test database, stored at a certification testing administration computing device, that includes a plurality of certification test parameters. For example, retrieving certification test parameters from the test database can include retrieving a subset of certification test questions selected from a certification test question bank, of the test database at the certification testing administration computing device, to generate the certification test. In one such instance, retrieving the subset of certification test questions selected from the certification test question bank can include: selecting a first subject matter category from a plurality of subject matter categories and selecting at least one certification test question of the subset of certification test questions from the selected first subject matter category; and selecting a second subject matter category from the plurality of subject matter categories and selecting at least one certification test question of the subset of certification test questions from the selected second subject matter category. In some applications, selecting the at least one certification test question of the subset of certification test questions from the selected first subject matter category can include using usage history associated with each of the certification test questions of the selected first subject matter category and using a historical rate of correct/incorrect answers associated with each of the certification test questions of the selected first subject matter category to retrieve the subset of certification test questions selected from the certification test question bank. In some applications, retrieving the subset of certification test questions selected from the certification test question bank can additionally include using usage history associated with each of a plurality of certification test questions and using a historical rate of correct/incorrect answers associated with each of a plurality of certification test questions to retrieve the subset of certification test questions selected from the certification test question bank. In some applications, retrieving the subset of certification test questions selected from the certification test question bank can include: (i) using the received student input to select at least one certification test question of the subset of certification test questions according to correspondence between the selected at least one certification test question of the subset of certification test questions and the certification test student, and (ii) using the received instructor input to select a certification test center site according to correspondence between the selected certification test center site and the certification test instructor.

In a further embodiment of this method, receiving student input, from the remote student device, associated with the certification test student can include each of: receiving student identification information associated with the certification test student, receiving a request to register the certification test student for a specified certification test, receiving a selection of one or more test center site locations at which the certification test student is willing to take the certification test, receiving a selection of one or more dates/times for scheduling the certification test for the certification test student, and receiving certification test payment information. And, receiving instructor input, from the remote instructor device, associated with the certification test instructor can include each of: receiving instructor identification information associated with the certification test instructor, receiving a request to register the certification test instructor for one or more certification tests, receiving professional nursing certification identification information associated with a professional nursing certification currently held by the certification test instructor, receiving a selection of one or more test center site locations at which the certification test instructor is willing to proctor the certification test, receiving a selection of one or more dates/times for scheduling the certification test for the certification test instructor to proctor, and receiving certification test instructor proctor compensation instructions.

Another embodiment includes a certification testing administration computing device having programmable processing circuitry. This programmable processing circuitry is configured to: receive student input, from a remote student device, associated with a certification test student; receive instructor input, from a remote instructor device, associated with a certification test instructor; assign a unique certification test code to the certification test instructor; use the received student input and the received instructor input to generate a certification test for the certification test student; and upon receiving the unique certification test code from the certification test instructor, administer the certification test.

In a further embodiment of this device, the programmable processing circuitry is further configured to: upon selection of a start exam icon at the remote instructor device, cause presentation of a first certification test code input display at the remote instructor device; and receive, as a result of presenting the first certification test code input display, the unique certification test code from the remote instructor device. As one example, the programmable processing circuitry can be configured to assign the unique certification test code to the certification test instructor: (i) after receiving both the student input associated with the certification test student and the instructor input associated with the certification test instructor, and (ii) upon scheduling the certification test. In an additional or alternative example, the programmable processing circuitry can further be configured to present a second certification test code input display at the remote instructor device after administering the certification test. For instance, the programmable processing circuitry can further configured to terminate the certification test as a result of receiving the unique certification test code assigned to the certification test instructor at the presented second certification test code input display.

In a further embodiment of this device, the programmable processing circuitry is configured to use the received student input and the received instructor input to generate the certification test by retrieving a subset of certification test questions selected from a certification test question bank to generate the certification test. And the programmable processing circuitry is configured to retrieve the subset of certification test questions selected from the certification test question bank by: selecting a first subject matter category from a plurality of subject matter categories and selecting at least one certification test question of the subset of certification test questions from the selected first subject matter category, and selecting a second subject matter category from the plurality of subject matter categories and selecting at least one certification test question of the subset of certification test questions from the selected second subject matter category.

In a further embodiment of this device, the programmable processing circuitry is configured to receive student input, from the remote student device, associated with the certification test student by: receiving student identification information associated with the certification test student, receiving a request to register the certification test student for a specified certification test, receiving a selection of one or more test center site locations at which the certification test student is willing to take the certification test, receiving a selection of one or more dates/times for scheduling the certification test for the certification test student, and receiving certification test payment information. And, the programmable processing circuitry is configured to receive instructor input, from the remote instructor device, associated with the certification test instructor by: receiving instructor identification information associated with the certification test instructor, receiving a request to register the certification test instructor for one or more certification tests, receiving professional nursing certification identification information associated with a professional nursing certification currently held by the certification test instructor, receiving a selection of one or more test center site locations at which the certification test instructor is willing to proctor the certification test, receiving a selection of one or more dates/times for scheduling the certification test for the certification test instructor to proctor, and receiving certification test instructor proctor compensation instructions.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

FIGS. 4A-4J illustrate screenshots of embodiments of displays that can be presented when administering a plurality of certification tests according to embodiments herein. FIG. 4A is a screenshot of an embodiment of a user profile display provided by a computing device for generating and providing a plurality of certification tests. FIG. 4B is a screenshot of an embodiment of a certification exam status display provided by a computing device for generating and providing a plurality of certification tests. FIG. 4C is a screenshot of an embodiment of a registered test center display provided by a computing device for generating and providing a plurality of certification tests. FIG. 4D is a screenshot of an embodiment of a new test center registration display provided by a computing device for generating and providing a plurality of certification tests. FIG. 4E is a screenshot of an embodiment of an administrator dashboard user display provided by a computing device for generating and providing a plurality of certification tests. FIG. 4F is a screenshot of an embodiment of a learning materials display provided by a computing device for generating and providing a plurality of certification tests. FIG. 4G is a screenshot of an embodiment of an available exams display provided by a computing device for generating and providing a plurality of certification tests. FIG. 4H is a screenshot of an embodiment of a certification exam creation display provided by a computing device for generating and providing a plurality of certification tests. FIG. 4I is a screenshot of an embodiment of a certification test start display provided by a computing device for generating and providing a plurality of certification tests. And FIG. 4J is a screenshot of an embodiment of a certification test start code input display provided by a computing device for generating and providing a plurality of certification tests.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
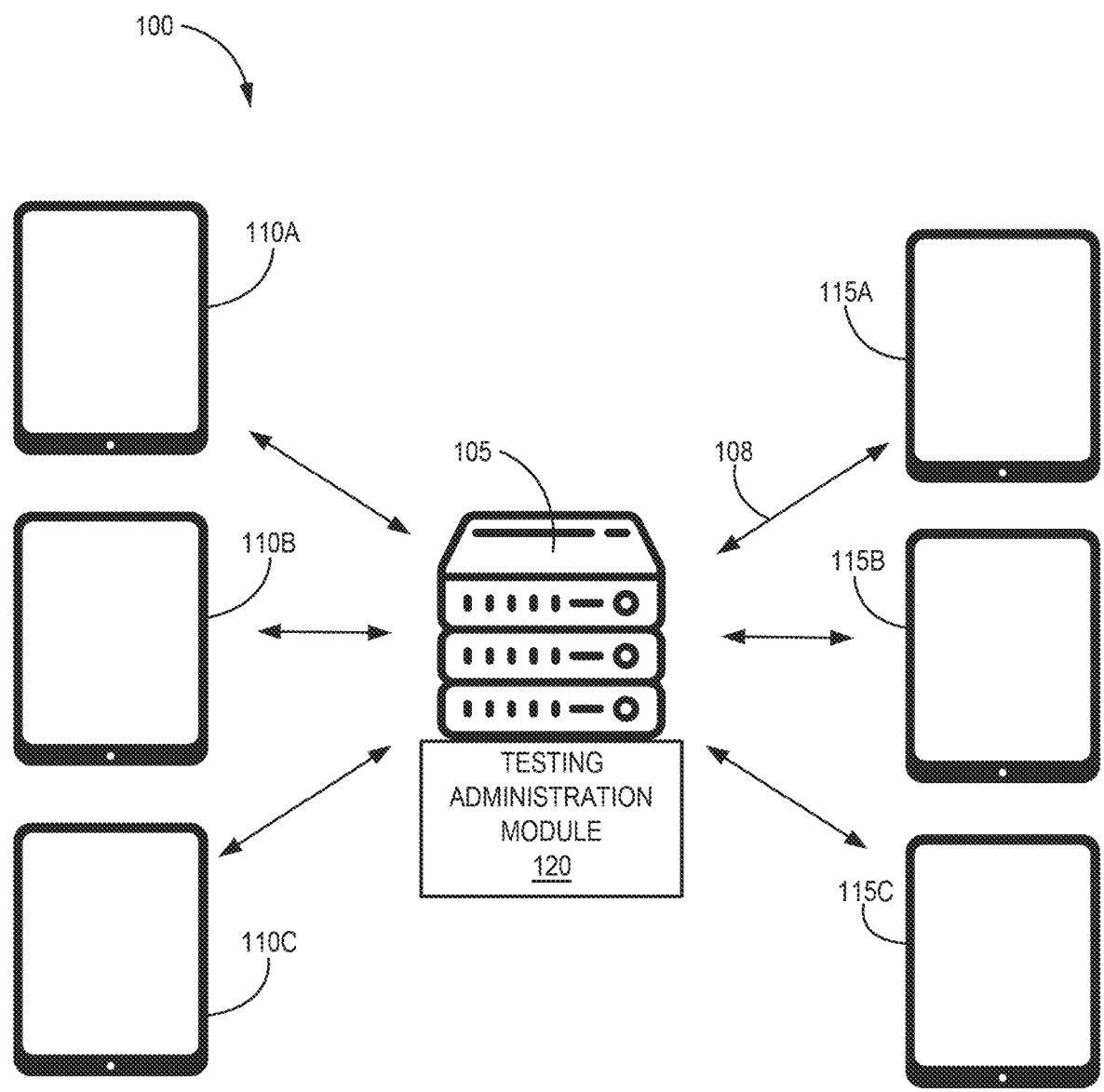
FIG. 1 is a schematic diagram of an embodiment of a system for generating and administering a plurality of certification tests.

FIG. 1 is a conceptual diagram illustrating an embodiment of a system 100 for generating and administering a plurality of certification tests, in accordance with some examples of this disclosure. The system 100 can include a variety of devices, including a computing device 105, one or more student devices 110A, 110B, 110C, and one or more instructor devices 115A, 115B, 115C. The computing device 105 can be in communication with each of the one or more student devices 110A, 110B, 110C and one or more instructor devices 115A, 115B, 115C via a communication channel 108 therebetween, and the one or more student devices 110A, 110B, 110C and/or one or more instructor devices 115A, 115B, 115C can be remotely located relative to the computing device 105. The communication channel 108 can be a wired or wireless communication channel, such as a wide area network communication channel, such as communication over an Internet connection or cellular connection.

Computing device 105 can be any computer with the processing power required to adequately execute the techniques described herein. For instance, computing device 105 may be any one or more of a remote server, remote server system, a mobile computing device (e.g., a smartphone, a tablet computer, a laptop computer, etc.), a desktop computer, or any other computerized device that may be configured to perform the techniques described herein. In many examples, computing device 105 can be a remote server configured to communicate with remote student devices 110A, 110B, 110C and remote instructor devices 115A, 115B, 115C.

Computing device 105 can include a test administration module 120 that is configured to administer a plurality of certification test. The test administration module 120 can execute locally (e.g., at processors 202 of computing device 105) to provide functions associated with generating and administering a plurality of certification tests, for instance using received inputs to generate a plurality of certification tests each in compliance with the received inputs. In some examples, test administration module 120 may act as an interface to a remote server accessible to computing device 105. For example, test administration module 120 may be an interface or application programming interface (API) to a remote server that generates the plurality of certification tests each in compliance with the received inputs.

Each of student devices 110A, 110B, 110C can be any computing device, including personal computers, mobile computing devices, and/or one or more servers configured to receive student input thereat and convey such received student input to the computing device 105. For example, each of student devices 110A, 110B, 110C can be a computing device used by a student to register for and/or take a certification test (e.g., student device 110A is a computing device of a first student, student device 110B is a computing device of a second, different student, remote advertising device 110C is a computing device of a third, different student). The student can be a person or entity who desires to take a certification test, such as a CNA certification test, for the purpose of ultimately obtaining the corresponding certification (e.g., a professional certification, such as a CNA certification). The respective student can provide one or more inputs at the respective student device 110A, 110B, 110C, and the computing device 105 can receive and store such student inputs for use in executing the testing administration module 120 at the computing device 105.

Each of instructor devices 115A, 115B, 115C can be any computing device, including personal computers, mobile computing devices, and/or one or more servers configured to receive instructor input thereat and convey such received instructor input to the computing device 105. For example, each of instructor devices 115A, 115B, 115C can be a computing device used by an instructor who desires to proctor a certification test administered using the computing device 105 (e.g., instructor device 115A is a computing device used by a first instructor, instructor device 115B is a computing device used by a second, different instructor, instructor device 115C is a computing device used by a third, different instructor). The respective instructor can provide one or more inputs at the respective instructor device 115A, 115B, 115C, and the computing device 105 can receive and store such instructor inputs for use in executing the testing administration module 120 at the computing device 105.

In accordance with the techniques described herein, computing device 105 can use received input from one or more of remote student devices 110A, 110B, 110C and/or one or more of instructor devices 115A, 115B, 115C, and computing device 105 can use this received input to administer certification tests (e.g., a first certification test of a plurality of certification tests; and a second, different certification test, having at least one different question, of a plurality of certification tests). Testing administration module 120 can be configured to use the received input from one or more student devices 110A, 110B, 110C and/or the received input from one or more instructor devices 115A, 115B, 115C to generate and administer a plurality of certification tests, for instance, such that the plurality of administered certification tests comply with one or more rules extracted from the input received from the one or more students (e.g., via the one or more student device 110A, 110B, 110C) the one or more instructors (e.g., via the one or more instructor devices 115A, 115B, 115C).

Figure 2:
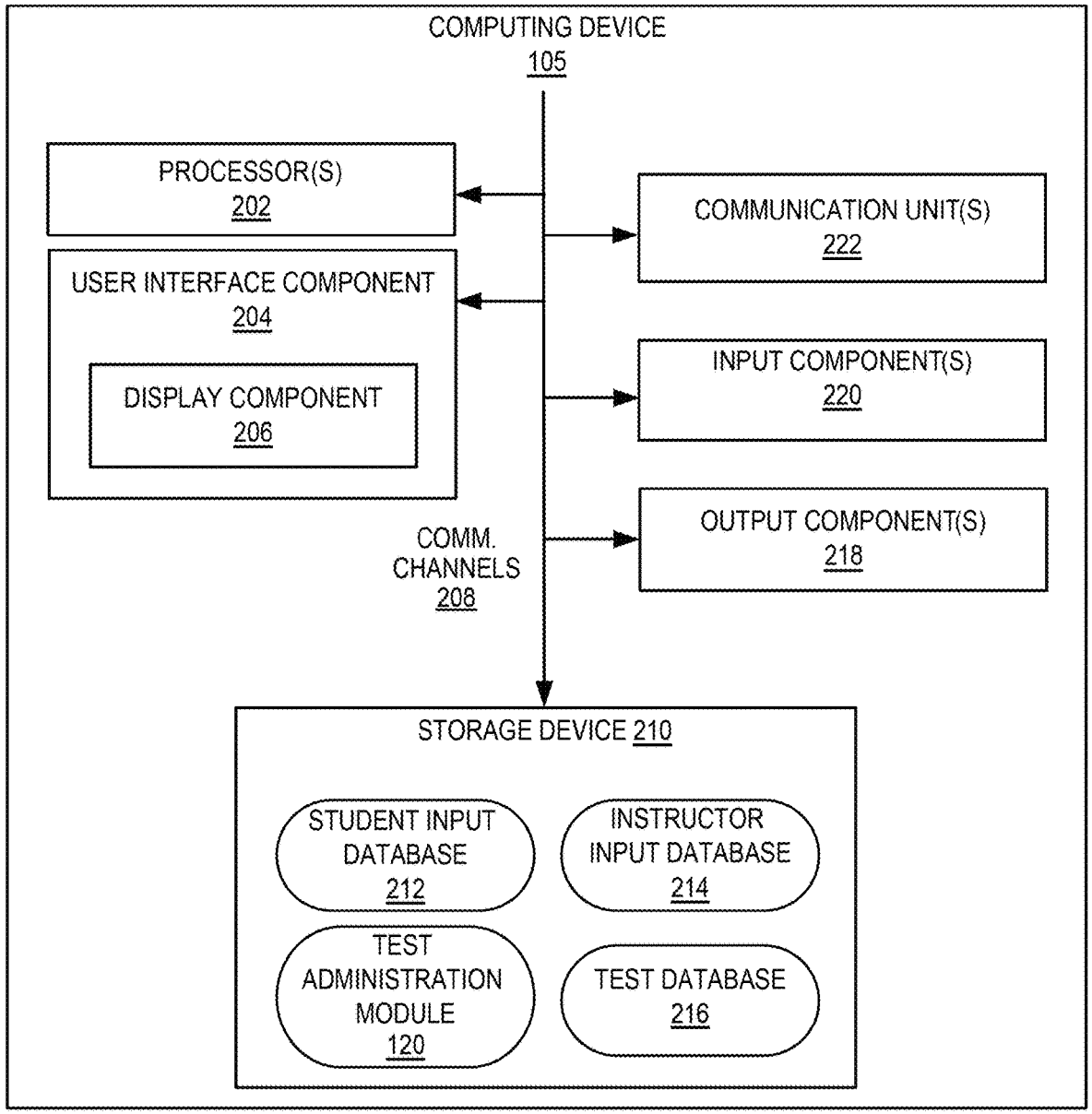
FIG. 2 is a block diagram of an embodiment of a computing device for generating and providing a plurality of certification tests.

FIG. 2 is a block diagram of an embodiment of the computing device 105 for generating and administering a plurality of certification tests, in accordance with some examples of this disclosure. FIG. 2 illustrates only one particular example of computing device 105, and many other examples of computing device 105 may be used in other instances and may include a subset of the components illustrated for example computing device 105 or may include additional components not illustrated at FIG. 2. As noted, computing device 105 can be any computer with the processing power required to adequately execute the techniques described herein.

As shown in the example of FIG. 2, computing device 105 can include programmable processing circuitry, such as one or more programmable processor(s), 202, user interface component 204 which can include a display component 206, one or more storage devices 210, one or more output components 218, one or more input components 220, and one or more communication units 222. Storage device 210 of computing device 105 can include student input database 212, instructor database 214, test database 216, and test administration module 120.

One or more programmable processors 202 can implement functionality and/or execute instructions associated with computing device 105 to administer one or more certification tests as disclosed herein. For example, one or more programmable processors 202 can implement functionality and/or execute instructions associated with computing device 105 to receive input from one or more student party devices and/or one or more instructor devices, store such received input in a corresponding student input database 212 and/or instructor database 214, and use such data stored at the student input database 212 and/or instructor input database 214 to administer certification test as disclosed herein. In some examples, the test database 216 can store data associated with certification test parameters (e.g., certification test question bank from which a subset of certification test questions are selected to generate the certification test) that are input into the test database 216, for instance by a party executing the computing device 105.

Examples of processor(s) 202 can include application processors, auxiliary processors, and any other hardware configure to function as a processor, a processing unit, or a processing device. Student input database 212, instructor input database 214, and/or test database 216 can be operable by processor(s) 202 to perform various actions, operations, or functions of computing device 105. For example, processor(s) 202 of computing device 105 can retrieve and execute computer readable instructions, such as computer readable instructions stored as the certification test generation instructions at test administration module 120, at storage device 210, that cause processor(s) 202 to perform the operations described with respect to administering and/or generating a certification test. The certification test generation instructions, when executed by processor(s) 202, may cause computing device 105 to utilize one or more data inputs saved at the student input database 212, instructor input database 214, and/or test database 216 to generate one or more certification tests (e.g., with each certification test administered and/or generated in compliance with the data inputs saved at the student input database 212, instructor input database 214, and/or test database 216).

Test administration module 120 can execute locally (e.g., at processor(s) 202) to provide functions associated with administering one or more certification tests. In some examples, test administration module 120 may act as an interface to a remote service accessible to computing device 105. For example, test administration module 120 may be an interface or application programming interface (API) to a remote server that utilizes received inputs stored at the storage device, such as stored data at one or more of the student input database 212, instructor input database 214, and test database 216, to administer one or more certification tests that include one or more certification test questions that prompt a responsive answer from a student assigned to take that particular certification test.

In some examples, communication unit(s) 222 may execute locally (e.g., at processor(s) 202) to provide functions associated with communicating with remote devices. In various examples, communication unit(s) 222 can be configured to receive input from one or more remote student devices and/or one or more instructor devices and/or to transmit data to one or more student devices and/or one or more remote instructor devices. Communication unit(s) 222 can include, for example, a wireless transceiver.

Storage device 210 at computing device 105 can store information for processing during operation of computing device 105 (e.g., computing device 105 can store data accessed by test administration module 120 during execution of the test administration instructions at computing device 105). Components at storage device 210, including student input database 212, instructor input database 214, test database 216, and test administration module 120, can include one or more computer-readable storage media. Such computer-readable storage media at the storage device 210 can include one or more non-transitory computer-readable storage mediums. Such storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories.

Communication channels 208 can interconnect each of the components 202, 204, 210, 218, 220, and 222 for inter-component communications (e.g., physically, communicatively, and/or operatively). In some examples, communication channels 208 may include a system bus, a network connection, an inter-process communication data structure, or any other suitable means for communicating data.

One or more input component(s) 220 of computing device 105 can receive user input at the computing device 105. Examples of input are tactile, audio, and video input. Input component(s) 220 of computing device 105 can be used to provide user input to the computing device, for instance, in specifying one or more operations or data aggregations to be executed. For example, input component(s) 220 can be configured to receive user input specifying a data report to be generated using data stored at any one or more of student input database 212, instructor input database 214, and test database 216.

One or more output component(s) 218 of computing device 105 may generate output in a selected modality. Examples of modalities may include a tactile notification, audible notification, visual notification, machine generated voice notification, or other modalities. Output component(s) 218 of computing device 105, in one example, can include any suitable type of device for generating output to a human or machine in a selected modality. As one such example, output component(s) 218 can be configured to output to a human viewer or machine readable device data from any one or more of student input database 212, instructor input database 214, and test database 216.

User interface component 204 of computing device 105 can include display component 206. Display component 206 can be a digital display screen at which information (e.g., a visual indication) is displayed by user interface component 204 to a user of the computing device 105. Display component 206 can, for example, display data from any one or more of student input database 212, instructor database 214, and test database 216.

In accordance with the techniques of this disclosure, communication unit(s) 222 can receive input from one or more from one or more remote student devices, and this received input from one or more from one or more remote student devices can be stored at the student input database 212. The input received from the one or more remote student devices and stored at the student input database 212 can be on an individual student basis, such that the received input can be stored at the student input database 212 on an individual student account basis. A student can be a person or entity who desires to take a certification test for the purpose of pursuing a certification (e.g., professional certification) by registering with an administrator of the certification test who assigns an instructor to proctor that test and provides the certification test, including a subset of certification test question selected from the test database 216.

Various types of input can be received from the one or more student devices, of a third party student, and stored at the student input database 212. For example, input received from the one or more student devices, of a third party student, and stored at the student input database 212 can include received: student bibliographic information (e.g., name, gender, and/or age), student request to register for a specified certification test, student selection of one or more test center site locations at which that student is willing to take a certification test, student selection of instructor (e.g., selection of instructor corresponding to the selected test center site location), student selection of one or more dates/times for scheduling a certification test for that student, and/or student certification test payment.

Various types of input can be received from the one or more instructor devices, of a third party instructor, and stored at the instructor input database 214. For example, input received from the one or more instructor devices, of a third party instructor, and stored at the instructor input database 214 can include received: instructor bibliographic information (e.g., name, gender, and/or age), instructor request to register as an instructor for one or more certification tests, identification of instructor's personal professional certification (e.g., received instructor certified nursing assistant certification identifier/number), instructor selection of one or more test center site locations at which that instructor is willing to serve as an instructor, instructor selection of one or more dates/times for scheduling a certification test for that instructor to proctor, and/or instructor proctoring compensation payment instructions.

Various types of input, such as certification test parameters, can be received (e.g., from an administrator user of the computing device 105) and stored at the test database 216. For example, certification test parameters stored at the test database 216 can include any one or more (e.g., each of) the following types of certification test parameters: a question bank that includes a plurality of questions for potential inclusion on a certification test, a corresponding subject matter category for each such question for potential inclusion on a certification test, a time duration allotted for completion of the certification test, past certification test usage history associated with one or more of the questions for potential inclusion on a certification test, past certification test rate of correctly/incorrectly answering associated with one or more of the questions for potential inclusion on a certification test, a certification test passing grade threshold associated with a specific type of certification test, past certification test grades received, and/or past certification test grades received for one or more subject matter categories associated with subsets of the questions stored in the question bank.

The data stored at one or more of the student input database 212, instructor input database 214, and test database 216 can be used by the processor(s) 202 according to the computer readable instructions stored at the test administration module 120. As one non-limiting example, the computer readable instructions stored at the test administration module 120, when executed, can cause the processor(s) 202 to utilize one or more look-up tables, stored at the test administration module 120, to use tagged correspondence, included at the look-up table(s), between data stored at the student input database 212, instructor input database 214, and/or test database 216. For instance, the test administration module 120 can store one or more such look-up tables with tagged correspondence between data stored at the student input database 212, instructor input database 214, and/or test database 216 to use data stored at the student input database 212 to: (i) select one or more certification test parameters from the test database 216 (e.g., select one or more subsets of questions from the test database 216 for inclusion on a certification test) according to correspondence between the selected one or more certification test parameters from the test database 216 and the student for whom the student input data at the student input database 212 corresponds, and (ii) select one or more instructor parameters from the instructor input database 214 (e.g., select one or more certification test center sites for a location to take the certification test) according to correspondence between the selected one or more instructor parameters from the instructor input database 214 and the student for whom the student input data at the student input database 212 corresponds. Accordingly, in this way, the data stored at student input database 212, instructor input database 214, and/or test database 216 can be used to tailor the administration of, and provision of, a certification test, or a plurality of certification tests such that the administered certification test(s) satisfy any one or more of the predetermined student inputs stored at the student input database 212, predetermined instructor inputs stored at the instructor input database 214, and/or predetermined certification test parameters stored at the test database 216. This can allow for efficient and convenient certification test administration at scale in a way that complies with a variety of predetermined input constraints stored at the storage device 210.

Figure 3:
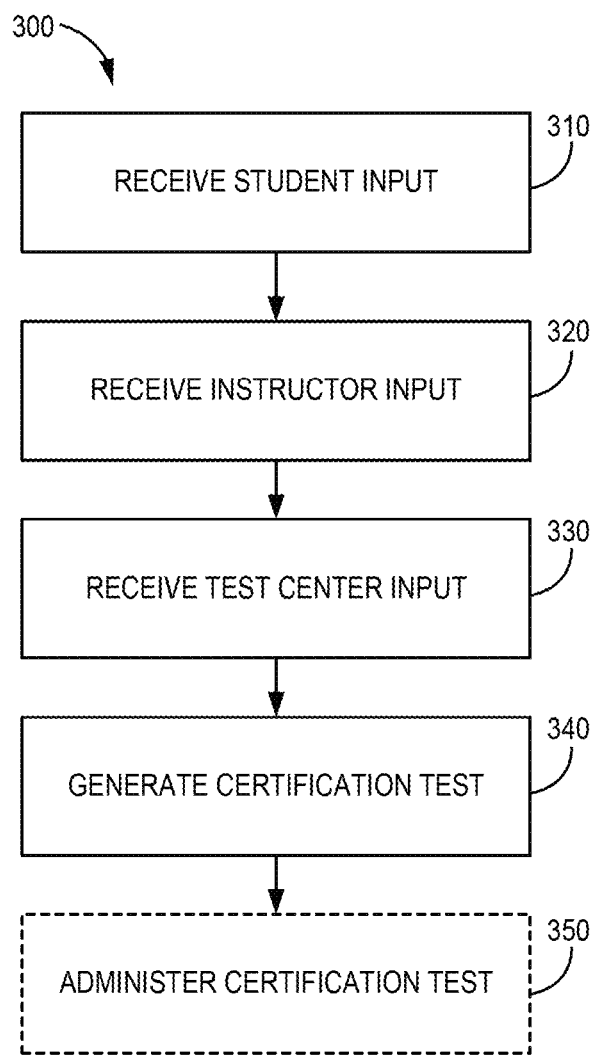
FIG. 3 is a flow diagram of an embodiment of a method for generating a certification test of a plurality of certification tests.

FIG. 3 is a flow diagram of an embodiment of a method 300 for administering a certification test, such as a CNA certification test. The method 300 can be carried out, for example, using any one or more embodiments of the system and/or computing device described elsewhere herein.

At step 310, the method 300 includes receiving student input from at least one student (e.g., via a remote student device). Received student input can be stored at the student input database and can include received: student bibliographic information (e.g., name, gender, and/or age), student request to register for a specified certification test, student selection of one or more test center site locations at which that student is willing to take a certification test, student selection of instructor (e.g., selection of instructor corresponding to the selected test center site location), student selection of one or more dates/times for scheduling a certification test for that student, and/or student certification test payment. Such received student input can be used in the method 300 to generate and/or administer one or more certification tests.

At step 320, the method 300 includes receiving instructor input from at least one instructor (e.g., via a remote instructor device). Received instructor input can be stored at the instructor input database and can include received: instructor bibliographic information (e.g., name, gender, and/or age), instructor request to register as an instructor for one or more certification tests, identification of instructor's personal professional certification (e.g., received instructor certified nursing assistant certification identifier/number), instructor selection of one or more test center site locations at which that instructor is willing to serve as an instructor, instructor selection of one or more dates/times for scheduling a certification test for that instructor to proctor, and/or instructor proctoring compensation payment instructions. Such received instructor input can be used in the method 300 to generate and/or administer one or more certification tests.

At step 330, the method 300 includes receiving test center input from at least one testing center locational site at which a certification test is to be administered. Received test center input can be stored at the test database and can include received: test center site location at which the certification test is to be administered, test center name, natural person name and contact information assigned as administrative contact for the test center, maximum number of students that can be accommodated for a single certification test administration at the test center, a type of certification test to be administered at the test center (e.g., a CNA certification test), and/or an instructor requested for proctoring a certification test at the test center. Such received test center input can be used in the method 300 to generate and/or administer one or more certification tests.

At step 340, the method 300 includes generating a certification test. The certification test can be generated using received student input, received instructor input, and/or received test center input. In addition or alternatively, the certification test can be generated using certification test parameters stored at the test database and such certification test parameters used for generating a certification test can include: a question bank that includes a plurality of questions for potential inclusion on a certification test, a corresponding subject matter category for each such question for potential inclusion on a certification test, a time duration allotted for completion of the certification test, past certification test usage history associated with one or more of the questions for potential inclusion on a certification test, past certification test rate of correctly/incorrectly answering associated with one or more of the questions for potential inclusion on a certification test, a certification test passing grade threshold associated with a specific type of certification test, past certification test grades received, and/or past certification test grades received for one or more subject matter categories associated with subsets of the questions stored in the question bank. In some embodiments, generating the certification test can include computer readable instructions, stored at the test administration module, executed by programmable processing circuitry to utilize one or more look-up tables, stored at the test administration module, to use tagged correspondence, included at the look-up table(s), between data stored at the student input database, instructor input database, and/or test database as described previously herein.

At step 350, the method 300, in certain embodiments, can include administering a certification test. The certification test administered at step 350 can be the certification test generated at step 340. Administering the certification test can include, in one embodiment, transmitting a plurality of certification test questions, which were selected as a subset of a larger set of certification test questions stored at the test database based on at least the received student input. Administering the certification test can further include, in one embodiment, comparing student received answers to the provided subset of certification test questions to a predetermined correct answer corresponding to each such certification test question to generate a certification test score. The generated certification test score can be sent to the corresponding student, using account information stored at the student input database and corresponding to that student who took the certification test, and/or to a regulatory authority that requires passing such certification test to receive a corresponding certification from that regulatory authority.

To help illustrate exemplary, non-limiting embodiments of receiving such input for generating certification tests, FIGS. 4A-4G are referenced as follows.

FIGS. 4A-4G show screenshots of embodiments of displays that can be presented (e.g., by execution of the test administration module) when administering a plurality of certification tests according to embodiments disclosed herein.

Figure 4A:

FIG. 4A is a screenshot of an embodiment of a user profile display 402 provided by a computing device, such as the computing device of FIG. 2 executing the test administration module, for generating and providing a plurality of certification tests. The user profile display 402 can present student bibliographic information (e.g., first name, last name) and a student status (e.g., active which indicates that the particular student's profile has been successfully created in compliance with each item of required student information and is current with the test administration module or other database and the particular student is enabled to submit a certification test application; pending which indicates that the particular student's profile has not yet been successfully created in compliance with each item of required student information and is not current with the test administration module or other database and the particular student is not yet enabled to submit a certification test application. The user profile display 402 can also display an application complete status indicating whether the particular student who is logged in has successfully submitted an approved application for taking a certification test. For instance, the application complete status can includes a positive or yes display associated with it which can indicate that the particular student's certification test application has been approved and the particular student is enabled to register for a certification test or a negative or no display associated with it which can indicate that the particular student's certification test application either has not been approved (e.g., not been submitted) or the term for that particular student's active applications status has expired.

In another embodiment, the user profile display 402 can correspond to an administrator profile that is logged in. When it is an administrator profile that is logged in, and not a student profile, additionally a users summary log 404 can be displayed, for instance, along with the user profile display 402. The users summary log 404 can include a displayed listing of user names, status of each such user (e.g., active, pending), the type of user for each listed user profile (e.g., student, instructor, administrator), and a link to edit the corresponding user profile for that listed user profile.

FIG. 4B is a screenshot of an embodiment of a certification exam status display 406 provided by a computing device, such as the computing device of FIG. 2 executing the test administration module, for generating and providing a plurality of certification tests. The certification exam status display 406 can present an exam date and time at which a particular certification exam is scheduled/was taken; an exam status (e.g., complete indicating the particular certification exam has been completed; in progress indicating that the particular certification exam is currently being taken; approved indicating that the particular certification exam has been approved for taking but has not yet started; pending indicating that the particular student has submitted an application for taking a certification test but that application has not yet been reviewed to approval or rejection); an exam result (e.g., pass indicating the particular certification test score was at or above the predetermined passing threshold score; fail indicating the particular certification test score was below the predetermined passing threshold score); student name corresponding to a registered student profile; instructor name corresponding to a registered instructor profile; test center at which the certification test has been take/is to be taken at the scheduled date; a first link to edit the corresponding exam profile for that listed certification exam; and a second link to access more detailed information stored in association with the particular listed certification test.

Figure 4C:
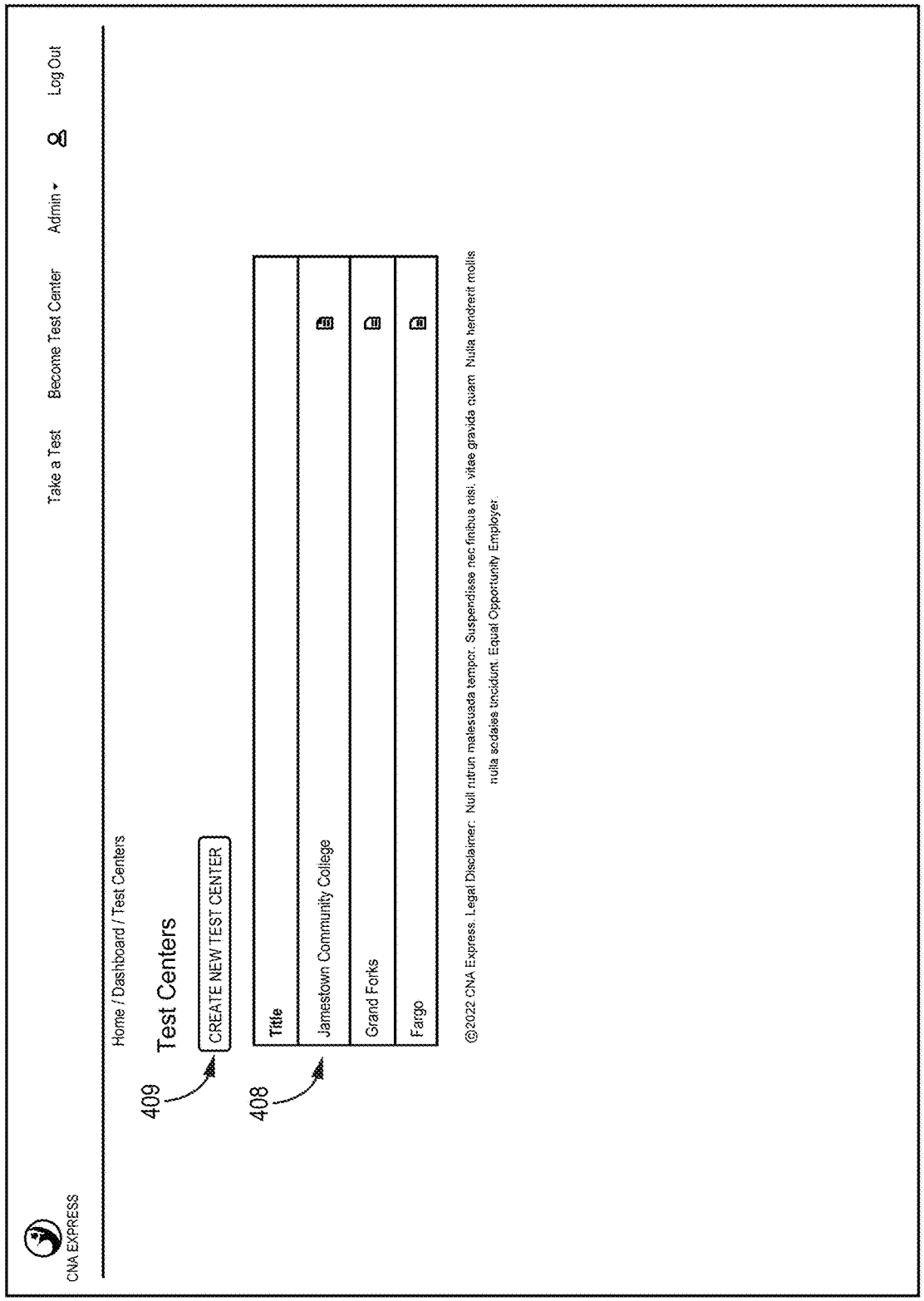

FIG. 4C is a screenshot of an embodiment of a registered test center display 408 provided by a computing device, such as the computing device of FIG. 2 executing the test administration module, for generating and providing a plurality of certification tests. The registered test center display 408 can present a listing of registered test center site names and a link to access more detailed information stored in association with the particular listed test center site. The registered test center display 408 can also present a link 409 for creating a new test center. Upon user selection of the link 409, the test administration module can be executed to present a new display, an embodiment of which is shown at FIG. 4D, for creating a new test center site registration.

Figure 4D:
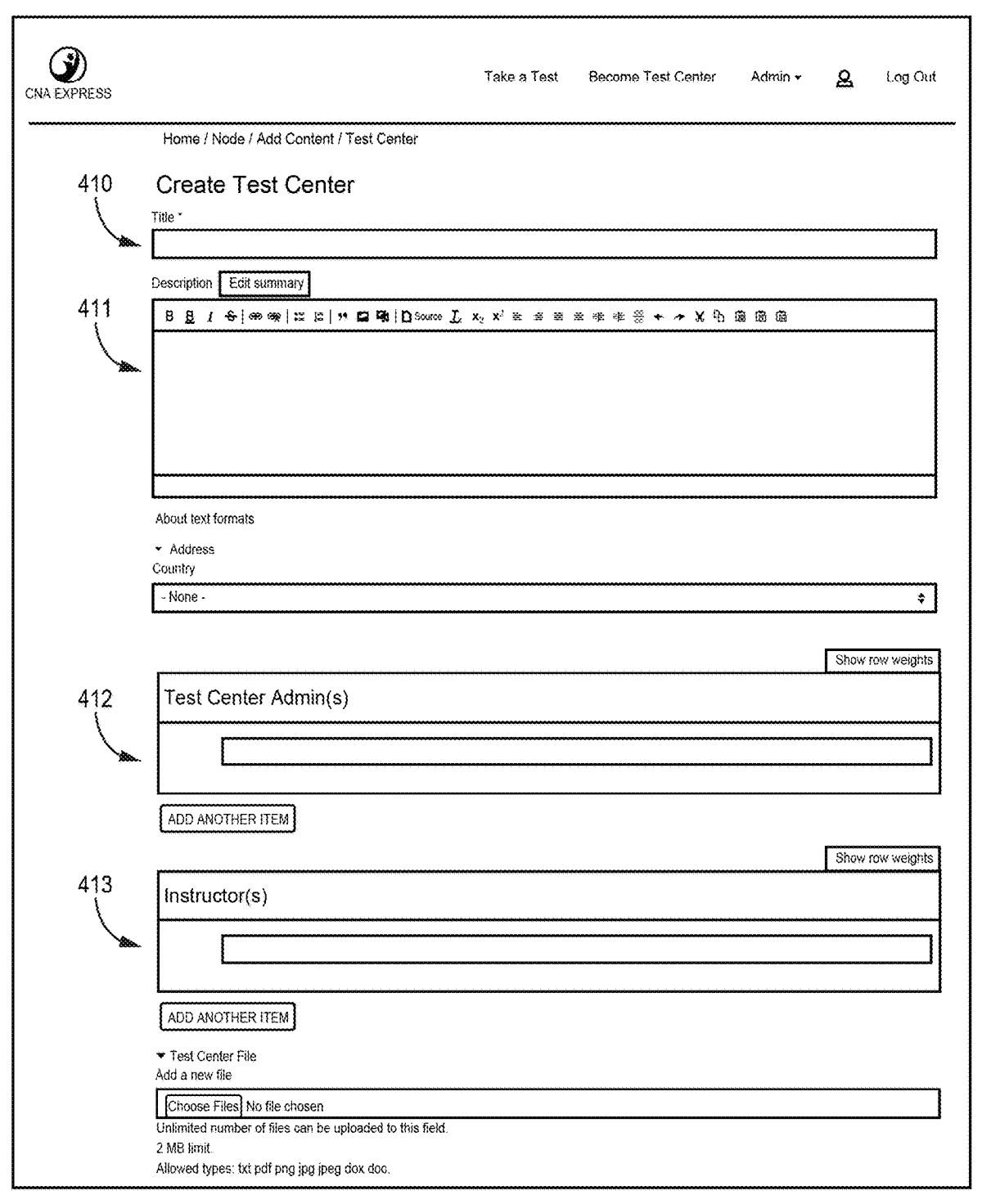

FIG. 4D is a screenshot of an embodiment of a new test center registration display 410 provided by a computing device, such as the computing device of FIG. 2 executing the test administration module, for generating and providing a plurality of certification tests. As noted, the new test center registration display 410 can be generated in response to user selection of the link 409 at the registered test center display 408. The new test center registration display 410 can present a first input field 411 for receiving user input specifying a new test center name, description (e.g., details as to available accommodations at that particular new test center), and location of the new test center. In addition, the new test center registration display 410 can present a second input field 412 for receiving user input specifying an administrator name and contact information for a person who is to serve as the administrative contact for the new test center being registered. And, the new test center registration display 410 can present a third input field 413 for receiving user input specifying one or more instructors available to proctor a certification exam at the new test center being registered.

FIG. 4E is a screenshot of an embodiment of an administrator dashboard user display 414 provided by a computing device, such as the computing device of FIG. 2 executing the test administration module, for generating and providing a plurality of certification tests. The administrator dashboard user display 414 can be accessed by an administrator of the test administration module, and the administrator dashboard user display 414 can present a listing of users associated with the test administration module. For example, as illustrated here, the administrator dashboard user display 414 can present a name (first and last name) for each user associated with the test administration module; a certification exam date/time (scheduled or taken) for each listed user associated with the test administration module; a role (e.g., student, instructor, test center administrator) of each listed user associated with the test administration module; a status (e.g., pending, active) of each listed user associated with the test administration module; an application status indication (e.g., application submitted, application approved) corresponding to the status of a certification test application of each listed student user associated with the test administration module; and a link to edit the corresponding user profile for that listed user associated with the test administration module.

Figure 4F:
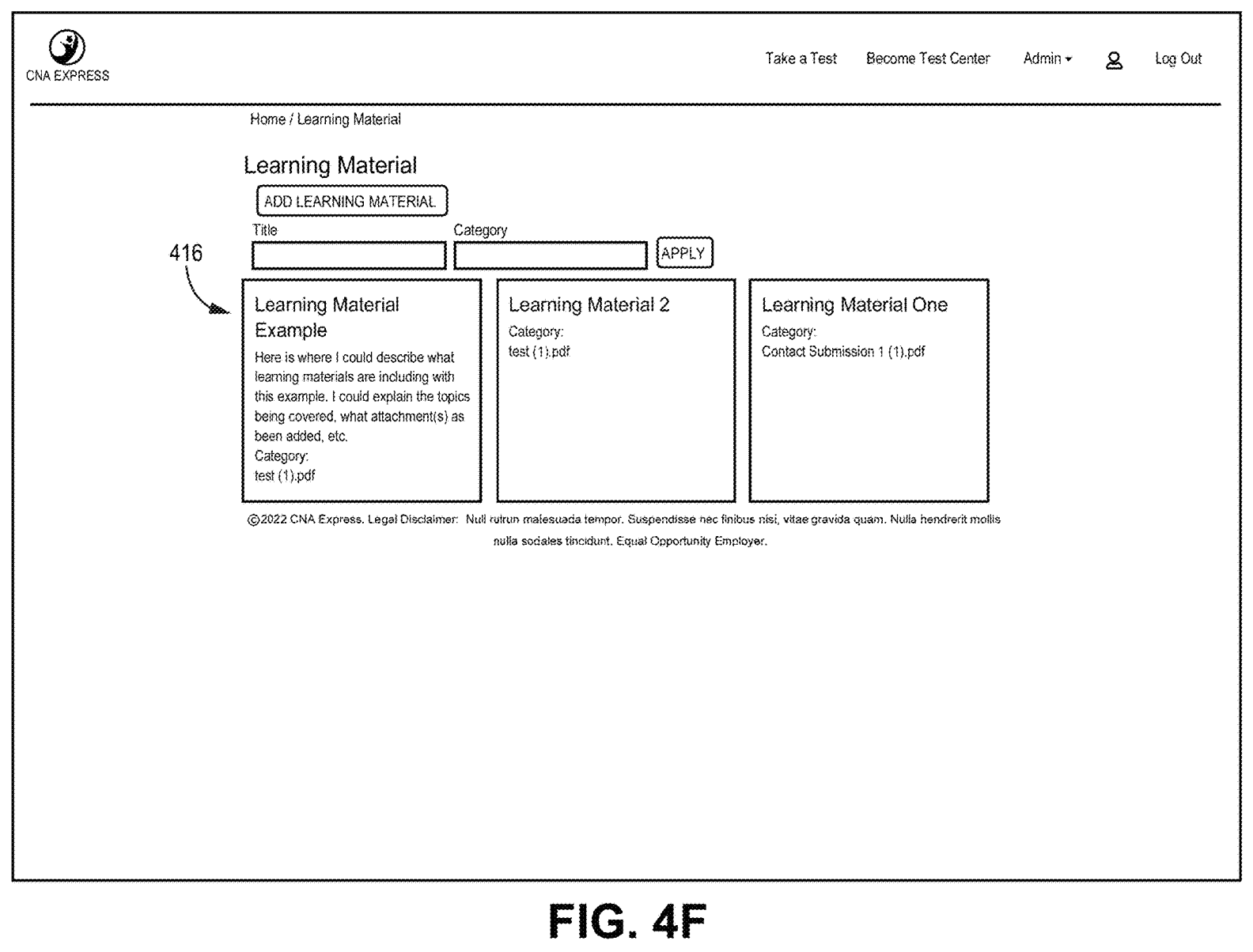

FIG. 4F is a screenshot of an embodiment of a learning materials display 416 provided by a computing device, such as the computing device of FIG. 2 executing the test administration module, for generating and providing a plurality of certification tests. The learning materials display 416 can present one or more educational materials, such as publications, on topics related to questions topics that will be included on a certification test. As one such example, the learning materials display 416 can present two or more different subject matter categories, and a user (e.g., a student) can select one of the subject matter categories to cause the test administration module to retrieve and present a plurality of practice certification test questions related to that selected subject matter category. For instance, the test administration module can access the student input database and/or test database to select a subject matter category for which to present learning materials at the learning materials display 416. This could include the test administration module being executed to discern, from the test database, one or more subject matter categories for which that particular student had relatively low scores on one or more prior certification tests, and then the test administration module being executed to present, at the learning materials display 416, one or more learning materials (e.g., practice questions; educational published literature on the subject matter) related to the one or more subject matter categories for which that particular student had relatively low scores on one or more prior certification tests.

Figure 4G:
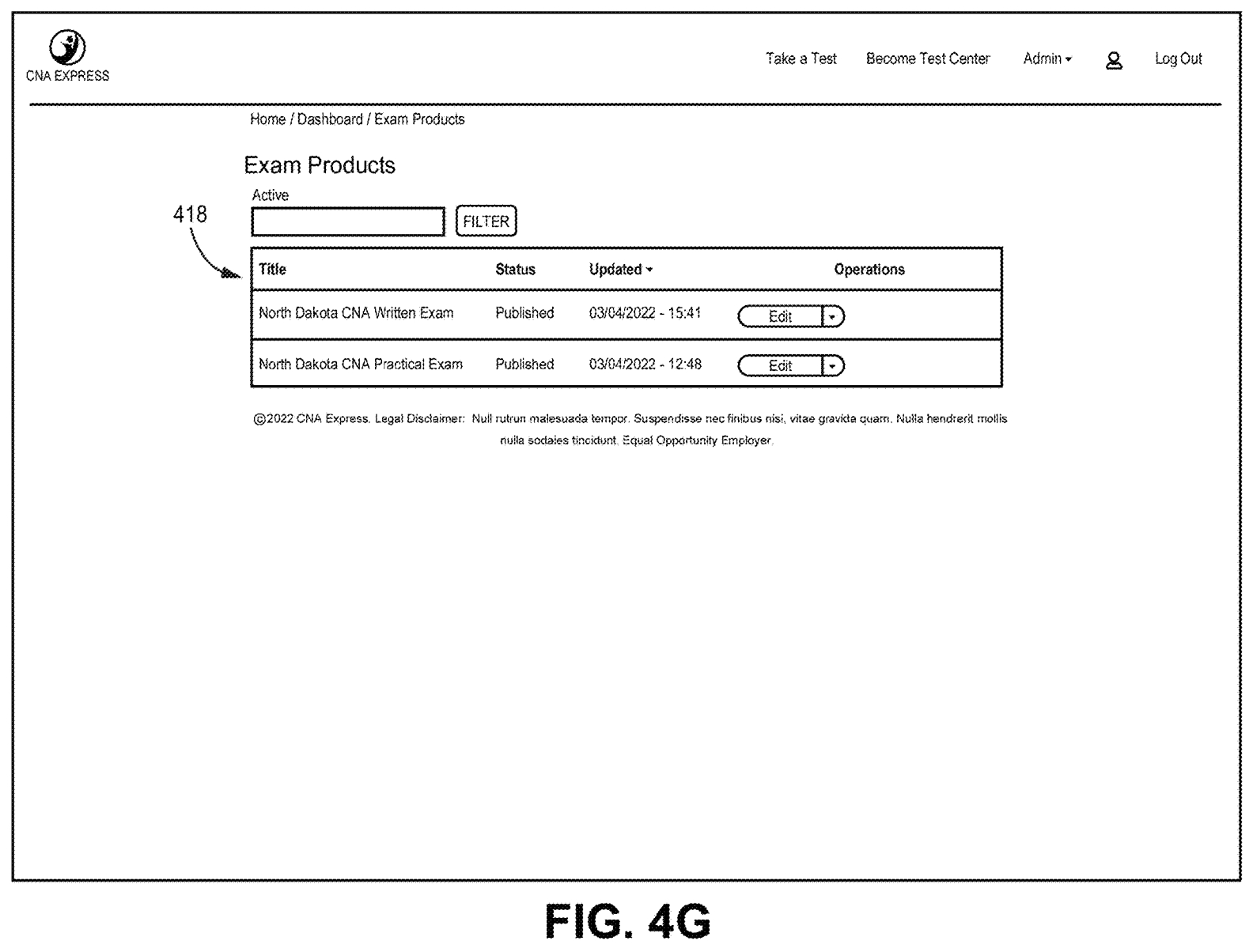

FIG. 4G is a screenshot of an embodiment of an available exams display 418 provided by a computing device, such as the computing device of FIG. 2 executing the test administration module, for generating and providing a plurality of certification tests. The available exams display 418 can present one or more published certification test exams. Moreover, the available exams display 418 can present a link to edit a listed certification test exam such that upon user selection of such link the selected certification test exam can be edited, for instance to swap out one or more questions included on that selected certification test exam for one or more other questions included in the certification test exam question database at the test database.

Figure 4H:
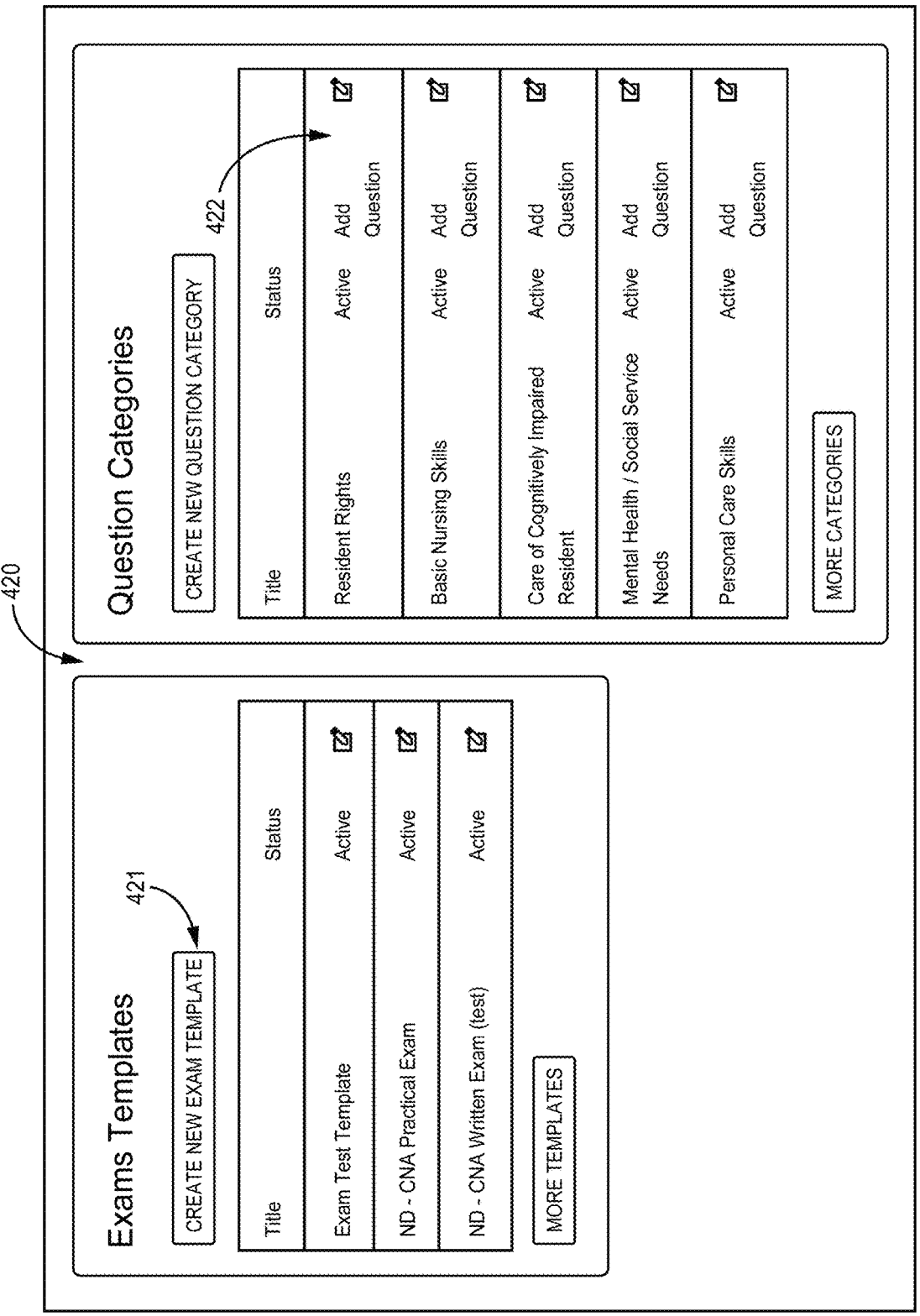

FIG. 4H is a screenshot of an embodiment of a certification exam creation display 420 provided by a computing device, such as the computing device of FIG. 2 executing the test administration module, for generating and providing a plurality of certification tests. The certification exam creation display 420 can be configured to allow a user (e.g., administrator, instructor) to create a new certification exam, for instance by providing user input at (e.g., selecting, clicking on with a cursor, touching via a touchscreen) a create new exam template icon 421. As one such example, to help such a user create a new certification exam, the certification exam creation display 420 can be configured to display a plurality of certification test question categories 422 categorized by the subject matter to which the questions relate. As described elsewhere herein, the certification exam creation display 420 can be configured to allow a user to select an individual certification test question category, of the plurality of displayed certification test question categories 422, and add one or more such questions from the selected individual certification test question category to a selected new certification exam from the exam templates display.

Accordingly, the certification exam creation display 420 can be configured to allow a user to view individual certification exam questions according to the subject matter category of those questions and selectively add certification test questions from a stored question bank displayed via the certification test question categories 422 to a new certification exam being created.

FIG. 4I is a screenshot of an embodiment of a certification test start display 424 provided by a computing device, such as the computing device of FIG. 2 executing the test administration module, for generating and providing a plurality of certification tests. The certification test start display 424 can display certification test details 425 (e.g., certification test identification number, certification test status, certification test scheduled date and time, identification of certification test template being used for the corresponding certification test), student and instructor details 426 (e.g., student name, student identification number, student contact information such as email and phone number, instructor name, instructor identification number, instructor contact information such as email and/or phone number) for the student and/or instructor corresponding to the particular certification test displayed at the certification test details 425, and test center details 427 (e.g., test center name, test center address, test center contact information such as email and/or phone number) for the test center site location corresponding to the particular certification test displayed at the certification test details 425. The certification test start display 424 can also include a start exam icon 428. The start exam icon 428 can be configured, when selected (e.g., clicked on with a cursor, touched via a touchscreen) by a user, to initiate the certification test indicated at the certification test details 425 for the student, proctored by the instructor, indicated at the student and instructor details 426 when such student and instructor are present at the test center indicated at the test center details 427. Accordingly, not only can embodiments disclosed herein be configured to receive student, instructor, and test center input and generate a plurality of certification tests using this input data, but embodiments disclosed herein can also then administer such generated certification tests, for instance upon user section of the start exam icon 428.

Figure 4J:
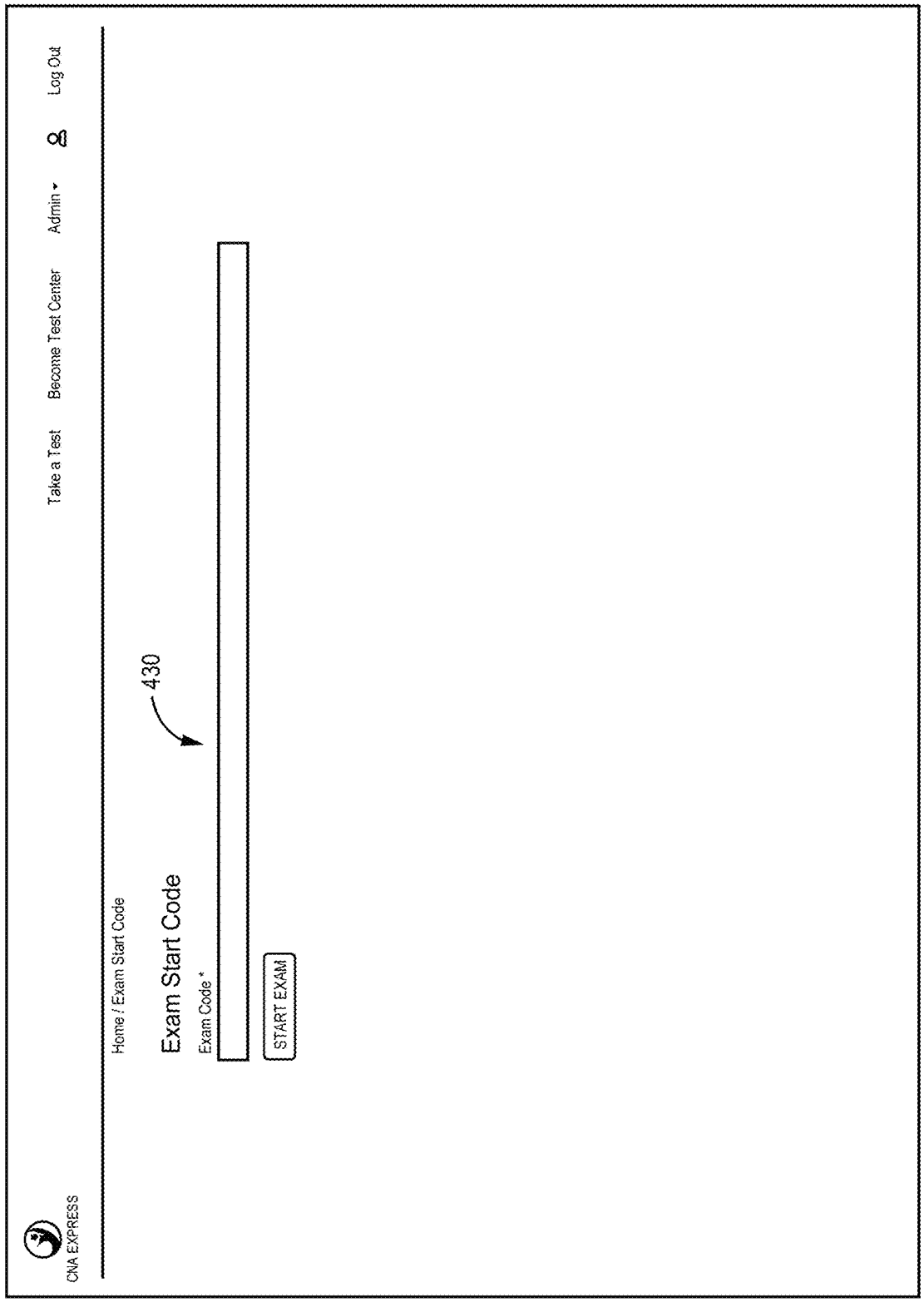

FIG. 4J is a screenshot of an embodiment of a certification test start code input display 430 provided by a computing device, such as the computing device of FIG. 2 executing the test administration module, for generating and providing a plurality of certification tests. The certification test start code input display 430 can be configured to be displayed to an instructor (e.g., at a user interface of an instructor device) upon the instructor selecting the start exam icon 428 at the certification test start display 424. When so displayed, the certification test start code input display 430 can be configured to receive a code input thereat, and upon confirmation that the received code input corresponds to a unique, authorized code assigned to an instructor scheduled to proctor the particular certification test being started, the particular certification test can begin. If the input code received at the start code input display 430 does not correspond to (e.g., match) the unique, authorized code assigned to the particular instructor scheduled to proctor the particular certification test being started, then the computing device executing the test administration module can be configured to prevent the particular certification test from starting. The unique, authorized code assigned to the particular instructor scheduled to proctor the particular certification test can be generated (e.g., by the computing device executing the test administration module) when a certification test has been scheduled for a particular student, and, in one further example, the unique, authorized code assigned to the particular instructor may become accessible (e.g., visible) to the particular instructor upon the corresponding certification test status becoming approved. In a further embodiment, the same code input display can additionally be presented upon the end of the particular certification test for entry again of the unique, authorized code assigned to the particular instructor scheduled to proctor the particular certification test that just ended. If the input code received at the code input display does not correspond to (e.g., match) the unique, authorized code assigned to the particular instructor scheduled to proctor the particular certification test that just ended, then the computing device executing the test administration module can be configured to prevent the particular certification test from being successfully completed. Thus, the presentation of the certification test start code input display 430 can provide a verification function that the assigned instructor was present and proctoring the certification test.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit (e.g., programmable microprocessor). Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising the steps of:
executing programmable processing circuitry at a certification testing administration computing device to receive student input, from a remote student device, associated with a certification test student;
executing programmable processing circuitry at the certification testing administration computing device to receive instructor input, from a remote instructor device, associated with a certification test instructor;
after receiving at least the instructor input, executing programmable processing circuitry at the certification testing administration computing device to use the instructor input to assign a unique certification test code to the certification test instructor;
executing programmable processing circuitry at the certification testing administration computing device to store, at the certification testing administration computing device, the assigned unique certification test code in association with the certification test instructor;
executing programmable processing circuitry at the certification testing administration computing device to use the received student input and the received instructor input to generate a certification test for the certification test student;
after generating the certification test, executing programmable processing circuitry at the certification testing administration computing device to cause a certification test code input to be displayed at the remote instructor device; and
upon receiving the unique certification test code from the certification test instructor in response to the display, executing programmable processing circuitry at the certification testing administration computing device to administer the certification test to the certification test student.

2. The method of claim 1, wherein the certification test code input display is presented at the remote instructor device as a result of selection of a start exam icon at the remote instructor device.

3. The method of claim 2, wherein the unique certification test code is assigned to the certification test instructor: (i) after receiving both the student input associated with the certification test student and the instructor input associated with the certification test instructor, and (ii) upon scheduling the certification test.

4. The method of claim 2, further comprising the step of:
after administering the certification test, presenting a second certification test code input display at the remote instructor device.

5. The method of claim 4, further comprising the steps of:
in response to presentation of the second certification test code input display, receiving the unique certification test code assigned to the certification test instructor; and;
in response to receiving, at the second certification test code input display, the unique certification test code assigned to the certification test instructor, terminating the certification test.

6. The method of claim 1, wherein using the received student input and the received instructor input to generate a certification test comprises retrieving certification test parameters from a test database, stored at the certification testing administration computing device, that includes a plurality of certification test parameters.

7. The method of claim 6, wherein retrieving certification test parameters from the test database comprises retrieving a subset of certification test questions selected from a certification test question bank, of the test database at the certification testing administration computing device, to generate the certification test.

8. The method of claim 7, wherein retrieving the subset of certification test questions selected from the certification test question bank comprises:
selecting a first subject matter category from a plurality of subject matter categories and selecting at least one certification test question of the subset of certification test questions from the selected first subject matter category; and
selecting a second subject matter category from the plurality of subject matter categories and selecting at least one certification test question of the subset of certification test questions from the selected second subject matter category.

9. The method of claim 8, wherein selecting the at least one certification test question of the subset of certification test questions from the selected first subject matter category comprises using usage history associated with each of the certification test questions of the selected first subject matter category and using a historical rate of correct/incorrect answers associated with each of the certification test questions of the selected first subject matter category to retrieve the subset of certification test questions selected from the certification test question bank.

10. The method of claim 8, wherein retrieving the subset of certification test questions selected from the certification test question bank further comprises using usage history associated with each of a plurality of certification test questions and using a historical rate of correct/incorrect answers associated with each of a plurality of certification test questions to retrieve the subset of certification test questions selected from the certification test question bank.

11. The method of claim 8, wherein retrieving the subset of certification test questions selected from the certification test question bank comprises: (i) using the received student input to select at least one certification test question of the subset of certification test questions according to correspondence between the selected at least one certification test question of the subset of certification test questions and the certification test student, and (ii) using the received instructor input to select a certification test center site according to correspondence between the selected certification test center site and the certification test instructor.

12. The method of claim 1, wherein receiving student input, from the remote student device, associated with the certification test student comprises receiving student identification information associated with the certification test student, receiving a request to register the certification test student for a specified certification test, receiving a selection of one or more test center site locations at which the certification test student is willing to take the certification test, receiving a selection of one or more dates/times for scheduling the certification test for the certification test student, and receiving certification test payment information.

13. The method of claim 12, wherein receiving instructor input, from the remote instructor device, associated with the certification test instructor comprises receiving instructor identification information associated with the certification test instructor, receiving a request to register the certification test instructor for one or more certification tests, receiving professional nursing certification identification information associated with a professional nursing certification currently held by the certification test instructor, receiving a selection of one or more test center site locations at which the certification test instructor is willing to proctor the certification test, receiving a selection of one or more dates/times for scheduling the certification test for the certification test instructor to proctor, and receiving certification test instructor proctor compensation instructions.

14. A certification testing administration computing device having programmable processing circuitry that is configured to:
   receive student input, from a remote student device, associated with a certification test student;
   receive instructor input, from a remote instructor device, associated with a certification test instructor;
   after receiving at least the instructor input, assign a unique certification test code to the certification test instructor;
   store the assigned unique certification test code in association with the certification test instructor;
   after receiving the student input and the instructor input, provide the assigned unique certification test code to the remote instructor device;
   use the received student input and the received instructor input to generate a certification test for the certification test student;
   after generating the certification test, cause a certification test code input to be displayed at the remote instructor device; and
   upon receiving the unique certification test code from the certification test instructor in response to the display, administer the certification test to the certification test student.

15. The device of claim 14, wherein the programmable processing circuitry is further configured to:
   upon selection of a start exam icon at the remote instructor device, cause presentation of the certification test code input display at the remote instructor device.

16. The device of claim 15, wherein the programmable processing circuitry is further configured to assign the unique certification test code to the certification test instructor: (i) after receiving both the student input associated with the certification test student and the instructor input associated with the certification test instructor, and (ii) upon scheduling the certification test.

17. The device of claim 15, wherein the programmable processing circuitry is further configured to present a second certification test code input display at the remote instructor device after administering the certification test.

18. The device of claim 17, wherein the programmable processing circuitry is further configured to terminate the certification test as a result of receiving the unique certification test code assigned to the certification test instructor at the presented second certification test code input display.

19. The device of claim 14,
wherein the programmable processing circuitry is configured to use the received student input and the received instructor input to generate the certification test by retrieving a subset of certification test questions selected from a certification test question bank to generate the certification test,
wherein the programmable processing circuitry is configured to retrieve the subset of certification test questions selected from the certification test question bank by: selecting a first subject matter category from a plurality of subject matter categories and selecting at least one certification test question of the subset of certification test questions from the selected first subject matter category, and selecting a second subject matter category from the plurality of subject matter categories and selecting at least one certification test question of the subset of certification test questions from the selected second subject matter category.

20. The device of claim 14,
wherein the programmable processing circuitry is configured to receive student input, from the remote student device, associated with the certification test student by: receiving student identification information associated with the certification test student, receiving a request to register the certification test student for a specified certification test, receiving a selection of one or more test center site locations at which the certification test student is willing to take the certification test, receiving a selection of one or more dates/times for scheduling the certification test for the certification test student, and receiving certification test payment information, and
wherein the programmable processing circuitry is configured to receive instructor input, from the remote instructor device, associated with the certification test instructor by: receiving instructor identification information associated with the certification test instructor, receiving a request to register the certification test instructor for one or more certification tests, receiving professional nursing certification identification information associated with a professional nursing certification currently held by the certification test instructor, receiving a selection of one or more test center site locations at which the certification test instructor is willing to proctor the certification test, receiving a selection of one or more dates/times for scheduling the certification test for the certification test instructor to proctor, and receiving certification test instructor proctor compensation instructions.

* * * * *